(12) United States Patent
Herington (10) Patent No.: US 8,356,098 B2
(45) Date of Patent: Jan. 15, 2013

(54) DYNAMIC MANAGEMENT OF WORKLOADS IN CLUSTERS

(75) Inventor: Daniel Edward Herington, Dallas, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 3723 days.

(21) Appl. No.: 10/704,875

(22) Filed: Nov. 10, 2003

(65) Prior Publication Data

US 2005/0102387 A1 May 12, 2005

(51) Int. Cl.
*G06F 13/00* (2006.01)
(52) U.S. Cl. .......................... 709/226; 709/220; 718/105
(58) Field of Classification Search .................. 709/201, 709/202, 223, 224, 220, 226; 718/1, 100, 718/104, 105
See application file for complete search history.

(56) References Cited

U.S. PATENT DOCUMENTS

| | | | |
|---|---|---|---|
| 6,571,288 B1 | 5/2003 | Sarukkai | |
| 7,243,351 B2* | 7/2007 | Kundu | ........................... 718/102 |
| 2002/0016812 A1 | 2/2002 | Uchishiba et al. | |
| 2002/0049842 A1 | 4/2002 | Huetsch et al. | |
| 2002/0069279 A1 | 6/2002 | Romero et al. | |
| 2002/0087694 A1 | 7/2002 | Daoud et al. | |
| 2002/0129127 A1 | 9/2002 | Romero et al. | |
| 2003/0033428 A1 | 2/2003 | Yadav | |

OTHER PUBLICATIONS

Sun Microsystems, Inc., White Paper, "Transforming the Economics of Computing", Optimizing IT Infrastructure Utilization, 2003, Chapters 1-5, pp. 1-10.
Sun Microsystems, Inc., White Paper, "N1—Introducing Just in Time Computing", An Executive Brief, 2002, 9 pages.
Sun Microsystems, Inc., N1 Technology Brief, "The I-Fabric Architecture", A core component of Sun's Terraspring software, 2002, 2 pages.
IBM Think Research papers: 1) eWLM: Distributed Computering (2 pages); 2) eWLM: Managing Complexity (2 pages); 3) eWLM: Allocating for Efficiency (2 pages); 4) The Great Balancing Act (2 pages); and 5) eWLM: Autonomic Computing (3 pages); 2002, eWLM: Enterprise Workload Management.
IBM Presentation: Workload Management for e-Business: eWLM, Mike Smith, Apr. 1, 2003, 27 pages.
Francisco Romero, "Dynamic Adaptive Server Provisioning for Blade Archit ctures".
Paul Henry Bouchier, et al., "Reconfiguration Support for a Multi Partition Computer System", U.S. Appl. No. 09/562,590, filed Apr. 29, 2000.
Clifford A. McCarthy, et al., "Dynamic Management of Virtual Partition Computer Workloads through Service Level Optimization", U.S. Appl. No. 10/206,594, filed Jul. 26, 2002.

(Continued)

*Primary Examiner* — Viet Vu (57) ABSTRACT

Systems and methods are disclosed for dynamic management of workloads in clusters. In one embodiment, the system comprises a first cluster comprising a first plurality of nodes, each node of the first plurality of nodes including a first application, and a first load balancer to route transactions for the first application to one of the first plurality of nodes. The system also comprises a second cluster comprising a second plurality of nodes, each node of the second plurality of nodes including a second application, and a second load balancer to route transactions for the second application to one of the second plurality of nodes. One or more intersecting nodes are included in the first and second plurality of nodes, each intersecting node including one or more workload managers to dynamically allocate one or more computer resources to the first application and the second application.

20 Claims, 6 Drawing Sheets

OTHER PUBLICATIONS

Clifford A. McCarthy, t al., "Dynamic Management of Computer Workloads through Service Level Optimization", U.S. Appl. No. 09/493,753, filed Jan. 28, 2000.

Hewlett Packard, hptc/ClusterPack_V2.0/1.1 hptc/ClusterPack General Overview, Jun. 18, 2003, 5 pages.

Hewlett Packard, technical white paper, hp-ux workload manager overview, May 2003, 22 pages.

IBM, Business Integration, Fact Sheet, New and enchanced versions of IBM WebSphere Business Integration for Industries, May 2003, 8 pages.

IBM, Clusters for e-business transformation, AIX Clustering, 2001, 6 pages.

D. F. Ferguson, et al., IBM Systems Journal, vol. 40, No. 1, WebSphere as an e-business server, 2001, pp. 25-45.

* cited by examiner

DYNAMIC MANAGEMENT OF WORKLOADS IN CLUSTERS

BACKGROUND OF THE INVENTION

Figure 1:
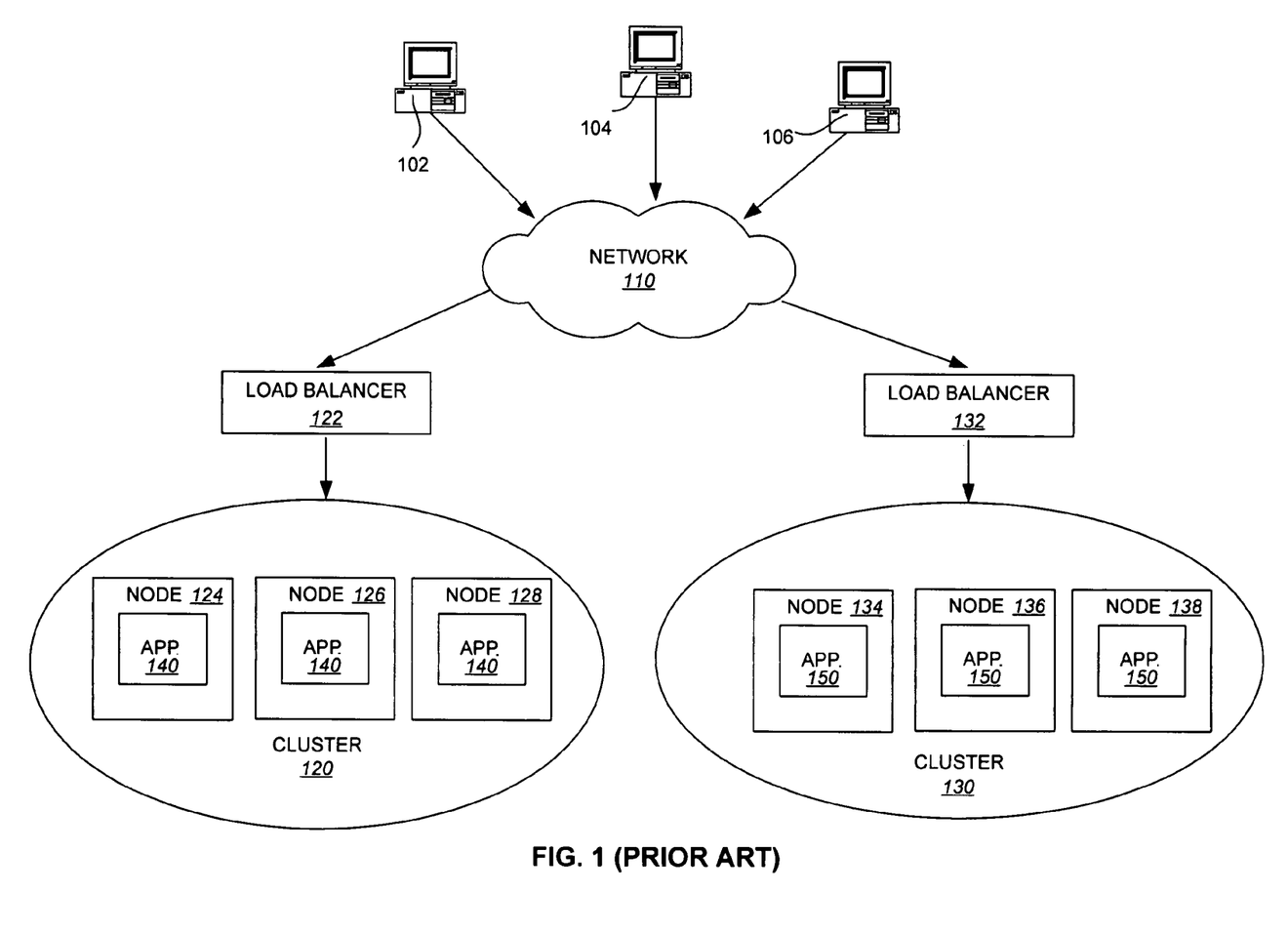
FIG. 1 illustrates a prior art management of workloads in a cluster.

A significant challenge in the modern data center is to ensure that enough computer resources are available to each application in the data center when there is a sudden peak in demand for the application. One approach that has been used is to combine multiple computer servers into a cluster. This approach is illustrated in FIG. 1. Each node 124, 126, 128 of cluster 120 appears to clients 102, 104, 106 as a single system. Similarly, each node 134, 136, 138 of cluster 130 appears to the clients 102, 104, 106 as a second single system.

Transactions for an application 140 running on nodes 124, 126, 128 of cluster 120 may be routed to one of the nodes of cluster 120 using load balancer 122. Transactions for a second application 150 running on nodes 134, 136, 138 of cluster 130 may be routed to one of the nodes of cluster 130 using load balancer 132.

Load balancers 122, 132 may be implemented in hardware or software, and may reside on one of the nodes of their respective clusters 120, 130 or may be a separate appliance. Each load balancer 122, 132 may route transactions to a particular node using a round-robin approach. Alternately, load balancers 122, 132 may select a particular node by monitoring loads or service levels of the nodes and selecting the node best able to handle the transaction.

SUMMARY OF THE INVENTION

Systems and methods are disclosed for dynamic management of workloads in clusters. In one embodiment, the system comprises a first cluster, which comprises a first plurality of nodes that each have a first application. The system also includes a second cluster, which comprises a second plurality of nodes that each have a second application. A first load balancer routes transactions for the first application to one of the first plurality of nodes. Similarly, a second load balancer routes transactions for the second application to one of the second plurality of nodes. One or more intersecting nodes are included in both the first and second plurality of nodes, each of which includes one or more workload managers to dynamically allocate one or more computer resources to the first application and the second application.

In another embodiment, the first load balancer further monitors service levels provided by each of the first plurality of nodes and routes transactions based on the service levels.

BRIEF DESCRIPTION OF THE DRAWINGS

Illustrative embodiments of the invention are illustrated in the drawings in which.

DETAILED DESCRIPTION

Although clustering allows for load balancing of applications between multiple servers, resources may be over allocated to handle peak demand requirements. This may lead to low utilization of the nodes during non-peak hours. Peak loads may be relatively short in duration and may occur at different times for applications 140, 150. Thus, nodes 124, 126, 128, 134, 136, 138 may be vastly under-utilized during the majority of the day.

Figure 2:
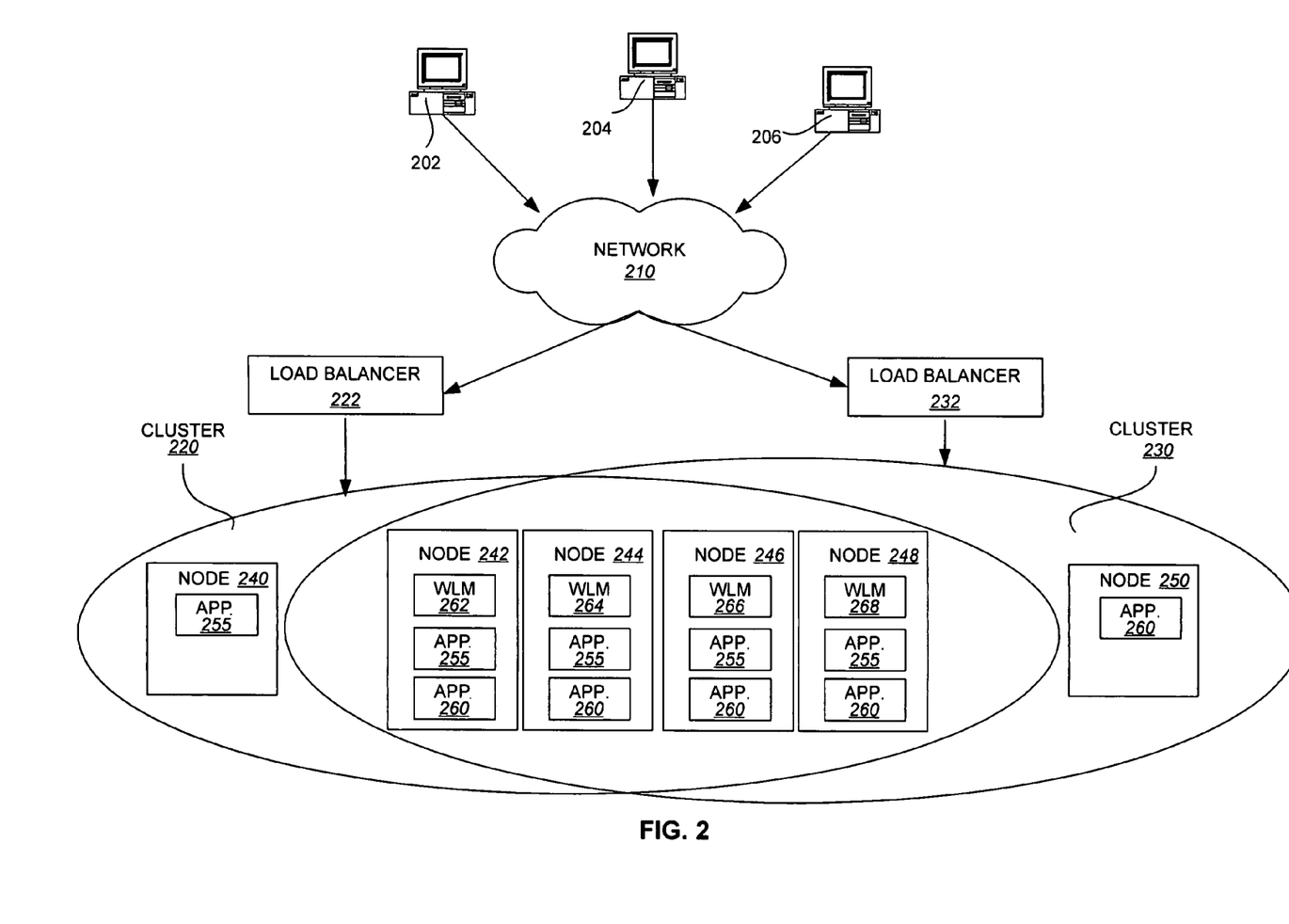
FIG. 2 illustrates an exemplary embodiment of a system for dynamic management of workloads in a cluster.

An exemplary system for dynamically managing workloads in a cluster is illustrated in FIG. 2. The system includes two clusters 220, 230. The clusters each comprise a plurality of nodes 240, 242, 244, 246, 248, 250 (e.g., server computers). The nodes 240, 242, 244, 246, 248 of the first cluster 220 are each running a first application 255. Similarly, the nodes 242, 244, 246, 248, 250 of the second cluster 230 are each running a second application 260. Each node 242, 244, 246, 248 of cluster 220 appears to clients 202, 204, 206 as a single system. Similarly, each node 242, 244, 246, 248, 250 of cluster 230 appears to the clients 202, 204, 206 as a second single system.

Clients 202, 204, 206 may issue transactions to applications 255, 260 via a network 210. By way of example, network 210 may be an intranet, Internet, or other communication mechanism that allows clients 202, 204, 206 to communicate with clusters 220, 230. Transactions for application 255 running on nodes 240, 242, 244, 246, 248 of cluster 220 may be routed to one of the nodes of cluster 220 using load balancer 222. Load balancer 232 similarly routes transactions for application 260 to one of the nodes 242, 244, 246, 248, 250 of cluster 230. Load balancers 222, 232 may be hardware or software and may be implemented in an external appliance, such as a switch, may reside on one of the nodes 240, 242, 244, 246, 248, 250, or another computer or device, or may be a component of their respective applications 255, 260. It should be appreciated that load balancers 222, 232 may each be implemented in a different manner than the other load balancer.

There are a number of intersecting nodes 242, 244, 246, 248 that are included in both clusters 220, 230. The intersecting nodes 242, 244, 246, 248 are each running both applications 255, 260. Additionally, intersecting nodes 242, 244, 246, 248 also each include one or more workload managers 262, 264, 266, 268 to dynamically allocate one or more computer resources to applications 245, 250. By way of example, resources may include processors, memory, input/output resources, data storage mediums (e.g., tape, disk, etc.), and connection bandwidth.

As the load increases for one of the applications 255, 260, workload balancers 262, 264, 266, 268 may adjust the resources on the nodes to allocate more resources to the application that is experiencing the increased load and fewer resources to the other application. Thus, the peak capacity of each application may be increased and the overall utilization of servers may go up. The dynamic allocation of resources will be described in further detail below with reference to FIGS. 4 and 5.

In one embodiment, load balancers 222, 232 may be intelligent load balancers that can route transactions to their respective applications 255, 260 by monitoring performance of the nodes in the cluster and determining which node is best able to handle the transaction. As the workload managers 262, 264, 266, 268 allocate more resources to an application 255, 260, the load balancers 222, 232 will correspondingly recognize a performance improvement in the node and route more transactions to the node; thus relieving traffic on the other nodes of the cluster.

By way of example, load balancer 222 may monitor service levels provided by each node 240, 242, 244, 246, 248 of cluster 220 and may route transactions to one of the nodes based on the level of service that the node is providing. Methods and apparatus for routing transactions based on a requested level of service are described in more detail in U.S. Patent Application Publication #2002/0069279 of Romero et al. entitled "Apparatus and Method for Routing a Transaction Based on a Requested Level of Service", which is hereby incorporated by reference for all that it discloses. Other load balancers that route transactions to nodes based on service levels, or other performance metrics, may also be used.

It should be appreciated that by using intelligent load balancers 222, 232, clusters 220, 230 may be asymmetric as the load balancers can recognize changes in performance of the nodes and route transactions accordingly. Thus, clusters 220, 230 do not need to be completely overlapping and may be different sizes. Additionally, the configurations of each of the workload managers 262, 264, 266, 268 on the nodes may be the same or different on each of the intersecting nodes and each node may be a different size and configuration. However, it should be appreciated that the system shown in FIG. 2 will also work with non-intelligent load balancers 222, 232, but may not be as efficient.

Figure 3:
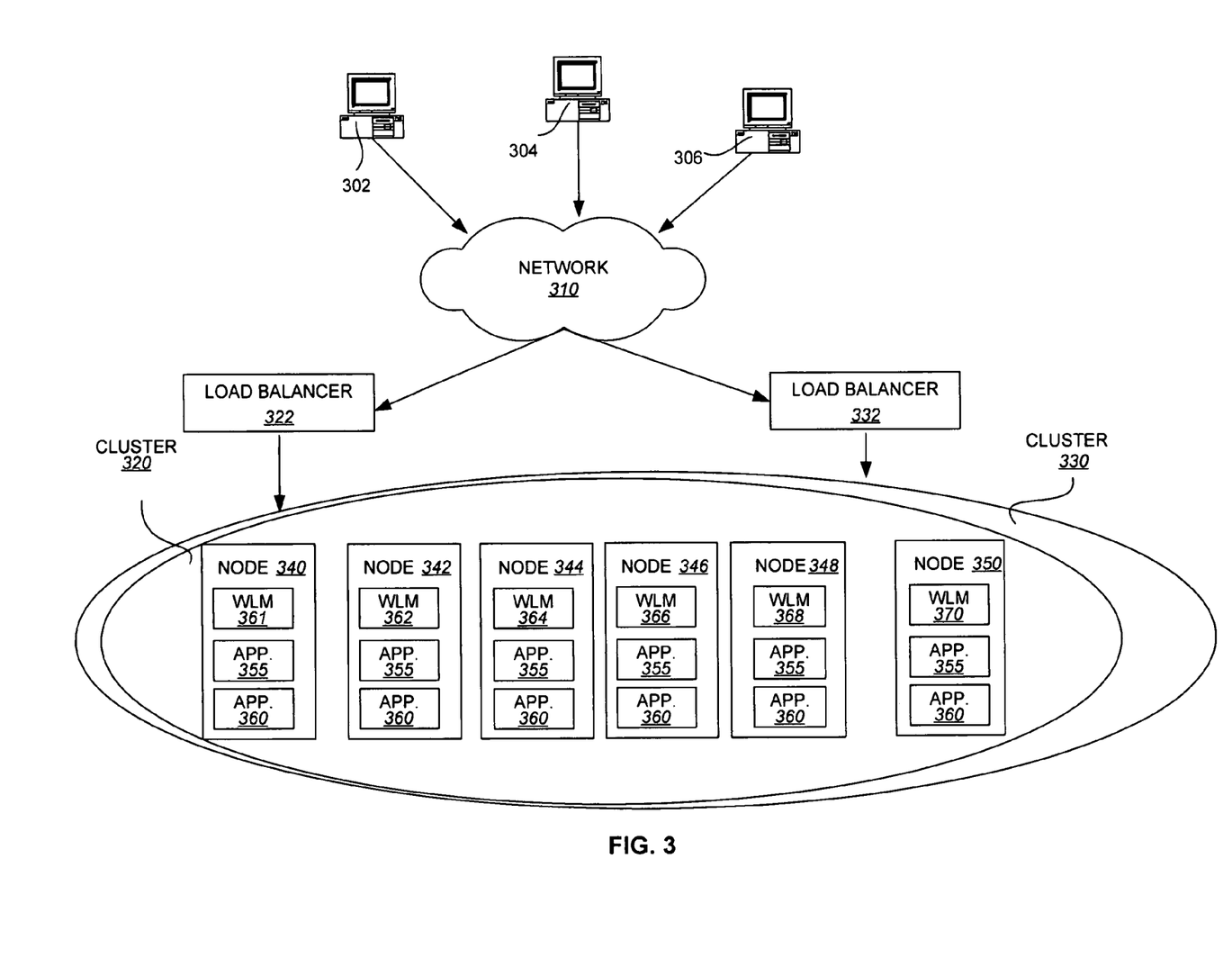
FIG. 3 illustrates a second exemplary embodiment of a system for dynamic management of workloads in a cluster.

FIG. 3 illustrates a system that may be used with load balancers 322, 332 that do not respond to changes in performance in the nodes. The system includes two clusters 320, 330. Clients 302, 304, 306 may issue transactions to applications 355, 360 via network 310. All of the nodes 340, 342, 344, 346, 348, 350 are contained in both clusters. Each node is running both applications 355, 360 and each node includes a workload manager 361, 362, 364, 366, 368, 370 to dynamically allocate one or more computer resources to the applications 355, 360. As the load increases for one of the applications 355, 360, the workload managers on all of the intersecting nodes may allocate more resources for the application experiencing the increased load. Thus, the peak capacity for each application may be increased.

Figure 4:
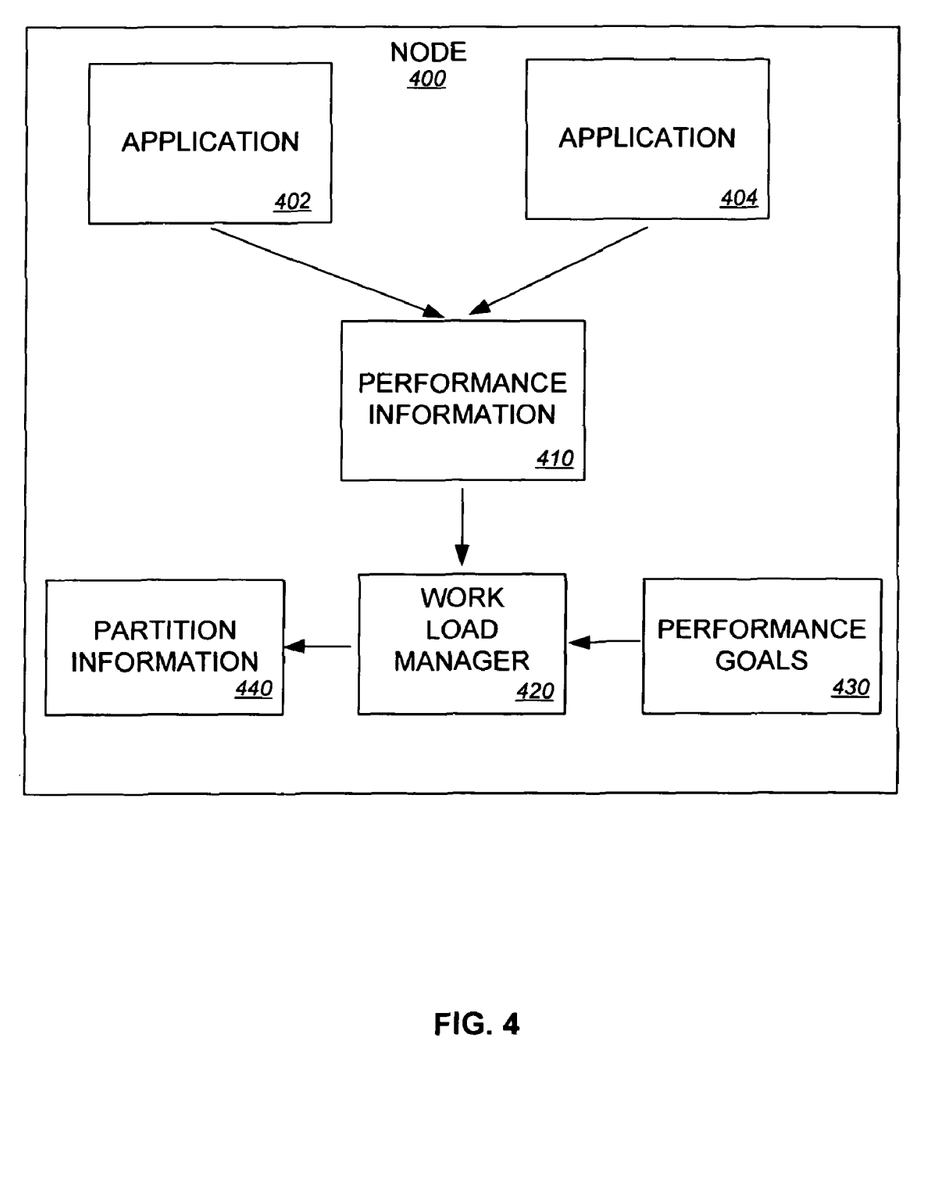
FIG. 4 illustrates a first exemplary embodiment of a node that may be part of the system of FIG. 2 or FIG. 3.

FIG. 4 illustrates a first exemplary embodiment of a node that may be one of the intersecting nodes in the system of FIG. 2 or 3. Node 400 includes one or more performance goals 430 for either or both of two applications 402, 404 included on node 400. Performance goals 430 may be a configuration file, information in a database, or other type of stored information that is defined by a user or system administration and may describe the desired level of performance of applications 402, 404. By way of example, performance goals 430 may include response time for the application or particular transactions supported by the application and/or resource utilization goals for the application. Other performance goals are also contemplated. The performance goals 430 and/or applications 402, 404 may each have a relative priority of importance associated with them.

Node 400 also includes workload manager 420. Workload manager receives performance information 410 from applications 402, 404. Performance information 410 may include information on the amount of resources an application is using or has used over a period of time. By way of example, information on CPU, memory, I/O, network percentages or absolute consumption for an application may be tracked over a period of time.

Workload manager 420 may dynamically allocate and adjust computer resources between applications 402, 404 based on performance goals 430 and performance information 410. In one embodiment, the resources may be partitioned between the two applications 402, 404 and the workload manager 420 may dynamically allocate computer resources to the applications by changing the partition information 440 to resize the partitions. By way of example, partition information 440 may be a sub-CPU resource partition (e.g., a Hewlett Packard Company's (a Delaware corporation having its principle place of business in Santa Clara, Calif.) process resource management) used to partition CPU resources. Other types of partitions are also contemplated. Further details of a system that may be used to dynamically allocated computer resources may be found in U.S. patent application Ser. No. 09/493,753 of McCarthy et al. entitled "Dynamic Management of Computer Workloads Through Service Level Optimization", which is hereby incorporated by reference for all that it discloses.

Figure 5:
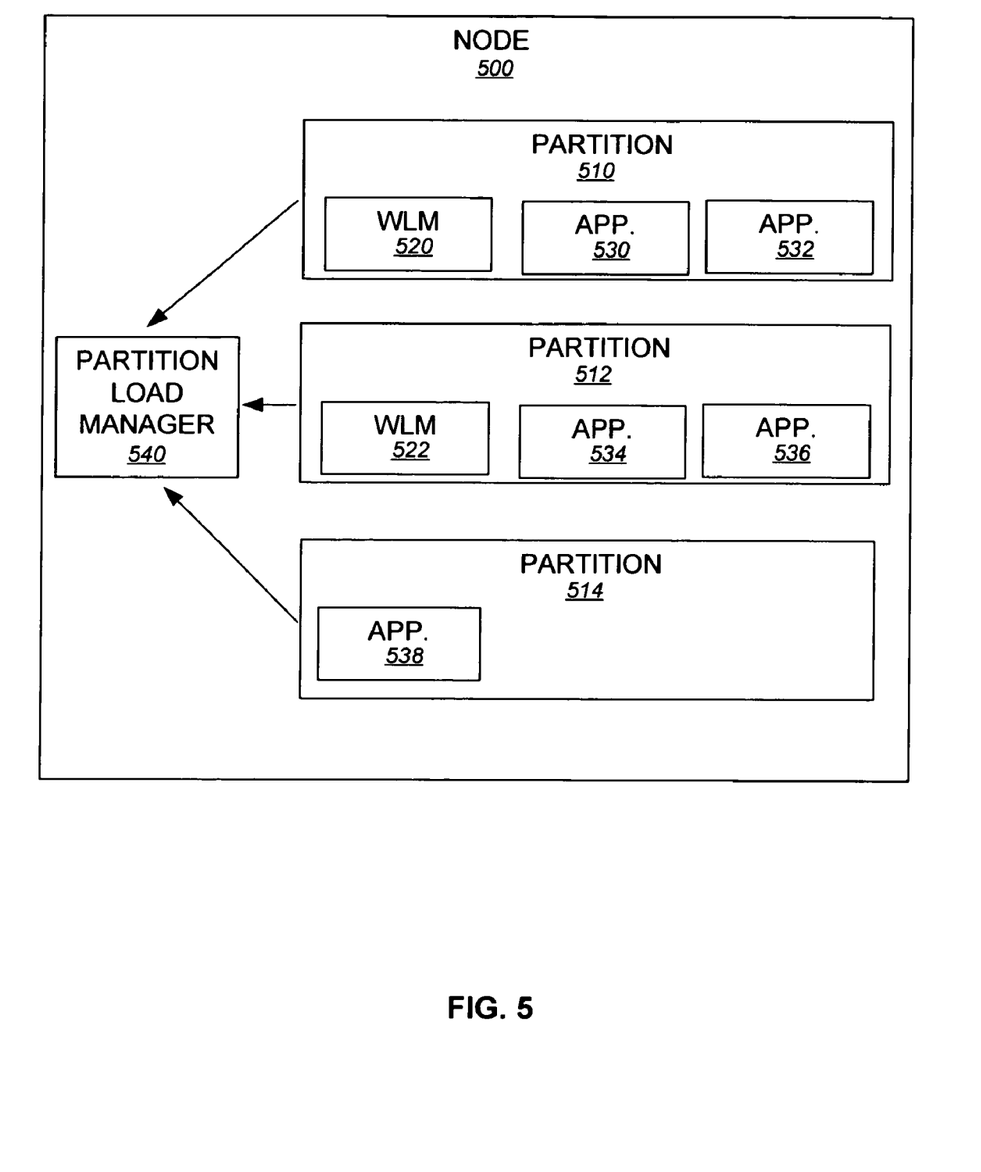
FIG. 5 illustrates a second exemplary embodiment of a node that may be part of the system of FIG. 2 or FIG. 3.

FIG. 5 illustrates a second exemplary embodiment of a node that may be one of the intersecting nodes in the system of FIG. 2 or FIG. 3. Node 500 is partitioned into multiple virtual partitions 510, 512, 514 (e.g., software-based partitions). Partitions 510, 512 each include a workload manager 520, 522 to dynamically allocate resources assigned to the partition between their respective applications 530, 532 (on partition 510) and applications 534, 536 (on partition 512). In alternate embodiments, partitions 510, 512 may not include a workload manager 520, 522 but instead may each include an agent that is capable of providing performance information to partition load manager 540. Resources may be dynamically allocated between applications on the same partition in a manner similar to that described with reference to FIG. 4.

Node 500 includes partition 514 executing application 538. Partition load manager 540 receives performance information from workload managers 520, 522, and application 538 and adjusts the sizes of the virtual partitions accordingly. In alternate embodiments, it should be appreciated that each partition 510, 512, 514 may include fewer or additional applications than that shown in FIG. 5. It should also be appreciated that in alternate embodiments, partition 514 may include a workload manager to interface with partition load manager 540. Partition load manager 540 may also include performance goals for one or more of the partitions 510, 512, 514 and/or one or more of the applications 530, 532, 534, 536, 538. Further details of a system that may be used to dynamically manage computer workloads using virtual partitions may be found in U.S. patent application Ser. No. 10/206, 594 of McCarthy et al., entitled "Dynamic Management of Virtual Partition Computer Workloads Through Service Level Optimization", which is hereby incorporated by reference for all that it discloses.

Figure 6:
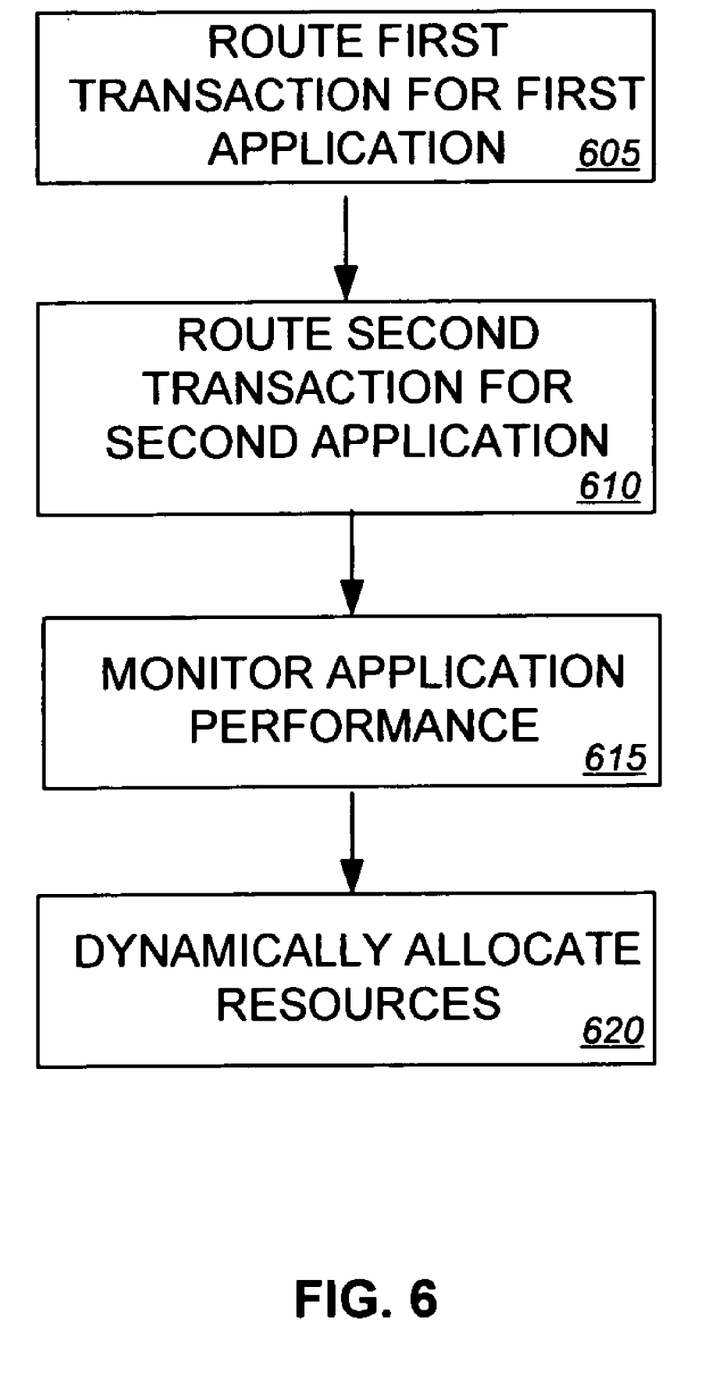
FIG. 6 is a flow diagram illustrating an exemplary method for dynamic management of workloads in a cluster that may be used by the system of FIG. 2 or FIG. 3.

FIG. 6 illustrates an exemplary method for dynamic management of workloads in a cluster that may be used by the system of FIG. 2 or 3. One or more transactions for application 255 are routed 605 to node 242. Node 242 is a member of both clusters 220, 230 and is executing both applications 255 and 260. Accordingly, one or more transactions for application 260 may also be routed 610 to node 242.

Application performance information 410 associated with either or both of the applications is monitored 615. By way of example, application performance information may include response time for the application or a particular type of transaction supported by the application. As described previously, one or more computer resources are dynamically allocated 620 to the application 255, 260 based on performance goals 430 for one or both of the applications and the application performance information 410. Resources may be dynamically allocated 620 by resizing one or more partitions (e.g., virtual partitions, process resource management groupings, etc.) on the node 242. Other methods may also be used to dynamically allocate resources.

In one embodiment, the method may further include monitoring service levels provided by each of the nodes 240, 242, 244, 246, 248 in the first cluster 220. Node 242 may then be selected based at least in part on its respective service level. Other performance metrics may also be used to select node 242 to satisfy the first transaction.

It should be appreciated that the methods described above may be performed by hardware components or may be embodied in sequences of machine-executable instructions, which may be used to cause a machine, such as a general-purpose or special-purpose processor or logic circuits programmed with the instructions to perform the actions set forth in FIG. 6. Alternatively, the methods may be performed by a combination of hardware and software.

What is claimed is:

1. A system comprising:
  a first cluster comprising a first plurality of nodes, each node of the first plurality of nodes including a first application;
  a first load balancer to route transactions for the first application to one of the first plurality of nodes;
  a second cluster comprising a second plurality of nodes, each node of the second plurality of nodes including a second application;
  a second load balancer to route transactions for the second application to one of the second plurality of nodes; and
  one or more intersecting nodes included in the first and second plurality of nodes, each intersecting node including one or more workload managers to dynamically allocate one or more computer resources to the first application and the second application.

2. The system of claim 1, wherein the workload managers dynamically allocate computer resources to the first and second applications based on at least one performance goal for at least one of the first and second applications and application performance information related to the one application.

3. The system of claim 1, wherein at least one performance goal comprises response time for the first application.

4. The system of claim 1, wherein at least one workload manager dynamically allocates one or more computer resources by resizing one or more partitions on its respective intersecting node.

5. The system of claim 4, wherein at least one of the partitions is a virtual partition.

6. The system of claim 4, wherein at least one of the partitions is a sub-CPU resource partition.

7. The system of claim 1, wherein at least one intersecting node comprises a plurality of workload managers, each workload manager associated with a virtual partition of the one intersecting node.

8. The system of claim 1, wherein the first load balancer further monitors service levels provided by each of the first plurality of nodes and routes transactions based on the service levels.

9. The system of claim 1, wherein the computer resources comprise one or more of a processor, memory, input/output resource, data storage medium, and connection bandwidth.

10. The system of claim 1, wherein the first and second plurality of nodes comprise servers.

11. A method comprising:
  routing a first transaction for a first application to a first node, the first node included in a first cluster and a second cluster;
  routing a second transaction for a second application to the first node;
  monitoring application performance information associated with the first and second applications; and
  dynamically allocating one or more computer resources to the first and second applications based on at least one performance goal for at least one of the first and second applications and the application performance.

12. The method of claim 11, wherein routing the first transaction comprises:
  monitoring service levels provided by each node in the first cluster; and
  selecting the first node based at least in part on its respective service level.

13. The method of claim 11, wherein dynamically allocating one or more computer resources comprises resizing one or more partitions on the first node.

14. The method of claim 13, wherein at least one of the partitions is a virtual partition.

15. The method of claim 13, wherein at least one of the partitions is a sub-CPU resource partition.

16. The method of claim 11, wherein the computer resources comprise one or more of a processor, memory, input/output resource, data storage medium, and connection bandwidth.

17. A system comprising machine-readable media having stored thereon sequences of instructions, which, when executed by a machine, cause the machine to perform the actions:
  routing a first transaction for a first application to a first node, the first node included in a first cluster and a second cluster;
  routing a second transaction for a second application to the first node;
  monitoring application performance information associated with the first application and the second application; and
  dynamically allocating one or more computer resources to the first application and the second application based on at least one performance goal for at least one of the first and second applications and the application performance.

18. The system of claim 17, wherein dynamically allocating one or more computer resources comprises resizing one or more partitions on the first node.

19. A system comprising:
  means for routing a first transaction for a first application to a first node, the first node included in a first cluster and a second cluster;
  means for routing a second transaction for a second application to the first node; and
  means for monitoring application performance information associated with the first and second applications and for dynamically allocating one or more computer resources to the first based on at least one performance goal for at least one of the first and second applications and the application performance.

20. The system of claim 19, wherein routing the first transaction comprises:
  monitoring service levels provided by each node in the first cluster; and
  selecting the first node based at least in part on its respective service level.

* * * * *